United States Patent
Kido et al.

(10) Patent No.: US 6,816,235 B2
(45) Date of Patent: Nov. 9, 2004

(54) OPTICAL GLASS AND PROJECTION EXPOSURE APPARATUS USING THE SAME

(75) Inventors: Kazuhiro Kido, Sagamihara (JP); Masahiko Sugisaki, Sagamihara (JP); Shizuo Matsumaru, Sagamihara (JP)

(73) Assignee: Nikon Corporation, Tokyo (JP)

( * ) Notice: Subject to any disclaimer, the term of this patent is extended or adjusted under 35 U.S.C. 154(b) by 61 days.

(21) Appl. No.: 09/958,745

(22) PCT Filed: Feb. 19, 2001

(86) PCT No.: PCT/JP01/01154

§ 371 (c)(1),
(2), (4) Date: Oct. 12, 2001

(87) PCT Pub. No.: WO01/60753

PCT Pub. Date: Aug. 23, 2001

(65) Prior Publication Data

US 2002/0172513 A1 Nov. 21, 2002

(30) Foreign Application Priority Data

Feb. 18, 2000 (JP) ........................ 2000-040686

(51) Int. Cl.⁷ .................. G03B 27/42; G03B 27/54; C03C 4/00; C03C 3/064
(52) U.S. Cl. .................. 355/67; 355/53; 501/903; 501/77
(58) Field of Search .................. 355/67, 53; 430/5; 501/77, 78, 52, 903

(56) References Cited

U.S. PATENT DOCUMENTS

| | | |
|---|---|---|
| 4,642,297 A | 2/1987 | Mennemann et al. |
| 5,340,778 A | 8/1994 | Kloss et al. |

FOREIGN PATENT DOCUMENTS

| | | |
|---|---|---|
| JP | A 54-3115 | 1/1979 |
| JP | 60-122745 | 7/1985 |
| JP | 60-221338 | 11/1985 |
| JP | A 62-87433 | 4/1987 |
| JP | 62-087433 | 4/1987 |
| JP | 62-100449 | 5/1987 |
| JP | 3-93644 | 4/1991 |
| JP | 5-201743 | 8/1993 |
| JP | 6-087627 | 3/1994 |
| JP | 6-144868 | 5/1994 |
| JP | 8-059281 | 3/1996 |
| JP | 8-217484 | 8/1996 |
| JP | 9-252043 | 9/1997 |
| JP | 10-072233 | 3/1998 |
| JP | A 10-340846 | 12/1998 |
| JP | A 11-79781 | 3/1999 |
| JP | 11-139844 | 5/1999 |

OTHER PUBLICATIONS

Japanese Optical Glass Industrial Standards, "Measuring Method for Internal Transmittance of Optical Glass", 17–1982.

Japanese Optical Glass Industrial Standards, "Measuring Method for Refractive Index of Optical Glass", 01–1975.

*Primary Examiner*—Peter B. Kim
(74) *Attorney, Agent, or Firm*—Oliff & Berridge, PLC

(57) ABSTRACT

The optical glass of the present invention comprises a composition in terms of weight ratio within the range of 0 to 14.8 wt % of $SiO_2$, 30 to 60 wt % of $B_2O_3$, 0 to 17.5 wt % of $Al_2O_3$, 0 to 0.4 wt % of $Li_2O$, 0 to 3 wt % of $Na_2O$, 0 to 3 wt % of $K_2O$, 0 to 5 wt % of MgO, 0 to 30 wt % of CaO, 0 to 30 wt % of SrO, 0 to 35 wt % of BaO, where RO (MgO+CaO+SrO+BaO) is 8 to 35 wt %, 0 to 20 wt % of ZnO, 0 to 6.5 wt % of $La_2O_3$, 0 to 15 wt % of $Gd_2O_3$, 0 to 15 wt % of $Y_2O_3$, 0 to 10 wt % of $Ta_2O_3$, 0 to 9.5 wt % of $ZrO_2$, 0 to 1 wt % of $As_2O_3$, and 0 to 0.5 wt % of $Sb_2O_3$; and has a refractive index (nd) of 1.52 to 1.65, an Abbe number (vd) of 55 to 61, and an 80% transmission wavelength (at a thickness of 10 mm including no reflection loss) of 330 nm or shorter.

3 Claims, 1 Drawing Sheet

US 6,816,235 B2

OPTICAL GLASS AND PROJECTION EXPOSURE APPARATUS USING THE SAME

TECHNICAL FIELD

The present invention relates to an optical glass, composed of a basic composition of $B_2O_3$—RO (where R indicates Mg, Ca, Sr and Ba), having a refractive index (nd) of 1.52 to 1.65, an Abbe number (vd) of 55 to 61, and an 80% transmission wavelength (at a thickness of 10 mm including no reflection loss) of 330 nm or shorter; and a projection exposure apparatus using the same.

BACKGROUND ART

Recently, as optical systems have come into wider use, opportunities to design optical glasses using wavelengths in ultraviolet regions have been increasing. Therefore, demands for developing optical glasses having various optical constants and exhibiting an excellent transmissivity in ultraviolet regions have been becoming greater year by year.

A number of optical glasses having optical constants with a refractive index (nd) within the range of 1.52 to 1.65 and an Abbe number (vd) within the range of 55 to 61 have conventionally been known, and optical glasses represented by an $SiO_2$—$B_2O_3$—$Al_2O_3$—BaO system have already been manufactured widely.

For example, Japanese Patent Application Laid-Open No. HEI 11-79781 discloses an optical glass of an $SiO_2$—$B_2O_3$—$Al_2O_3$—$La_2O_3$—CaO—$Li_2O$ system as an optical glass having the above-mentioned optical constants and exhibiting an excellent chemical durability. Also, Japanese Patent Application Laid-Open No. SHO 62-87433 discloses an optical glass of an $SiO_2$—$B_2O_3$—BaO system having an 80% transmission wavelength (at a thickness of 10 mm including no reflection loss) of 340 nm or shorter as an optical glass having the above-mentioned optical constants and exhibiting a high transmissivity in ultraviolet regions. Further, Japanese Patent Application Laid-Open No. HEI 03-93644 discloses an optical glass of an $SiO_2$—$B_2O_3$—BaO system having an 80% transmission wavelength (at a thickness of 10 mm including no reflection loss) of 320 nm or shorter. In this specification, "80% transmission wavelength (at a thickness of 10 mm including no reflection loss)" is the wavelength measured according to JOGIS 17-1982 "Measuring Method for Internal Transmittance of Optical Glass." Specifically, a sample having a thickness of 10 mm is irradiated with light, the spectral transmissivity of the sample at the time when it includes no reflection loss is measured, and the wavelength (nm) of the irradiation light when the resulting spectral transmissivity is 80% (when 80% of all the light beams irradiating the sample are transmittable) is taken as the above-mentioned wavelength.

DISCLOSURE OF THE INVENTION

However, $SiO_2$, which is introduced in the above-mentioned conventional optical glass in order to secure the chemical durability thereof and so forth, raises the temperature required for melting the glass. Therefore, impurities are more likely to mingle into the optical glass from crucible materials, furnace materials, and the like in the process of manufacturing the optical glass, whereby the lowering of ultraviolet transmissivity in the resulting optical glass has become problematic. Also, $La_2O_3$, introduced into the above-mentioned conventional optical glass in order to raise the refractive index thereof, lowers the ultraviolet transmissivity of the optical glass when introduced by a large amount.

In view of various problems of the above-mentioned conventional optical glasses, it is an object of the present invention to provide an optical glass having a refractive index (nd) of 1.52 to 1.65, an Abbe number (vd) of 55 to 61, and an 80% transmission wavelength (at a thickness of 10 mm including no reflection loss) of 330 nm or shorter and exhibiting an excellent i-line transmissivity; and a projection exposure apparatus using the same, which can attain a high resolution.

The inventors repeated diligent studies in order to achieve the above-mentioned object and, as a result, have found that an optical glass having predetermined optical constants mentioned above and exhibiting a high ultraviolet transmissivity is obtained in an optical glass of a $B_2O_3$—RO system (where R indicates Mg, Ca, Sr and Ba) if the composition ratio of constituents is adjusted into a specific range, thereby reaching the present invention.

Namely, the optical glass of the present invention comprises a composition in terms of weight ratio within the range of 0 to 14.8 wt % of $SiO_2$, 30 to 60 wt % of $B_2O_3$, 0 to 17.5 wt % of $Al_2O_3$, 0 to 0.4 wt % of $Li_2O$, 0 to 3 wt % of $Na_2O$, 0 to 3 wt % of $K_2O$, 0 to 5 wt % of MgO, 0 to 30 wt % of CaO, 0 to 30 wt % of SrO, 0 to 35 wt % of BaO, where RO (MgO+CaO+SrO+BaO) is 8 to 35 wt %, 0 to 20 wt % of ZnO, 0 to 6.5 wt % of $La_2O_3$, 0 to 15 wt % of $Gd_2O_3$, 0 to 15 wt % of $Y_2O_3$, 0 to 10 wt % of $Ta_2O_5$, 0 to 9.5 wt % of $ZrO_2$, 0 to 1 wt % of $As_2O_3$, and 0 to 0.5 wt % of $Sb_2O_3$; and has a refractive index (nd) of 1.52 to 1.65, an Abbe number (vd) of 55 to 61, and an 80% transmission wavelength (at a thickness of 10 mm including no reflection loss) of 330 nm or shorter.

The optical glass comprising such a composition of constituents has a refractive index (nd) of 1.52 to 1.65, an Abbe number (vd) of 55 to 61, and an 80% transmission wavelength (at a thickness of 10 mm including no reflection loss) of 330 nm or shorter and exhibits an excellent i-line transmissivity.

The projection exposure apparatus of the present invention comprises an exposure light source, a reticle formed with a pattern original image, an illumination optical system for illuminating the reticle with light outputted from the exposure light source, a projection optical system for projecting onto a photosensitive substrate a pattern image outputted from the reticle, and an alignment system for positioning the reticle and the photosensitive substrate with respect to each other; wherein at least a part of optical glasses constituting the illumination optical system, optical glasses constituting the projection optical system, and the reticle is made of the optical glass of the present invention.

Since the projection exposure apparatus of the present invention comprises the optical system constituted by the optical glass of the present invention, it can yield an excellent resolution.

BEST MODES FOR CARRYING OUT THE INVENTION

Figure 1:
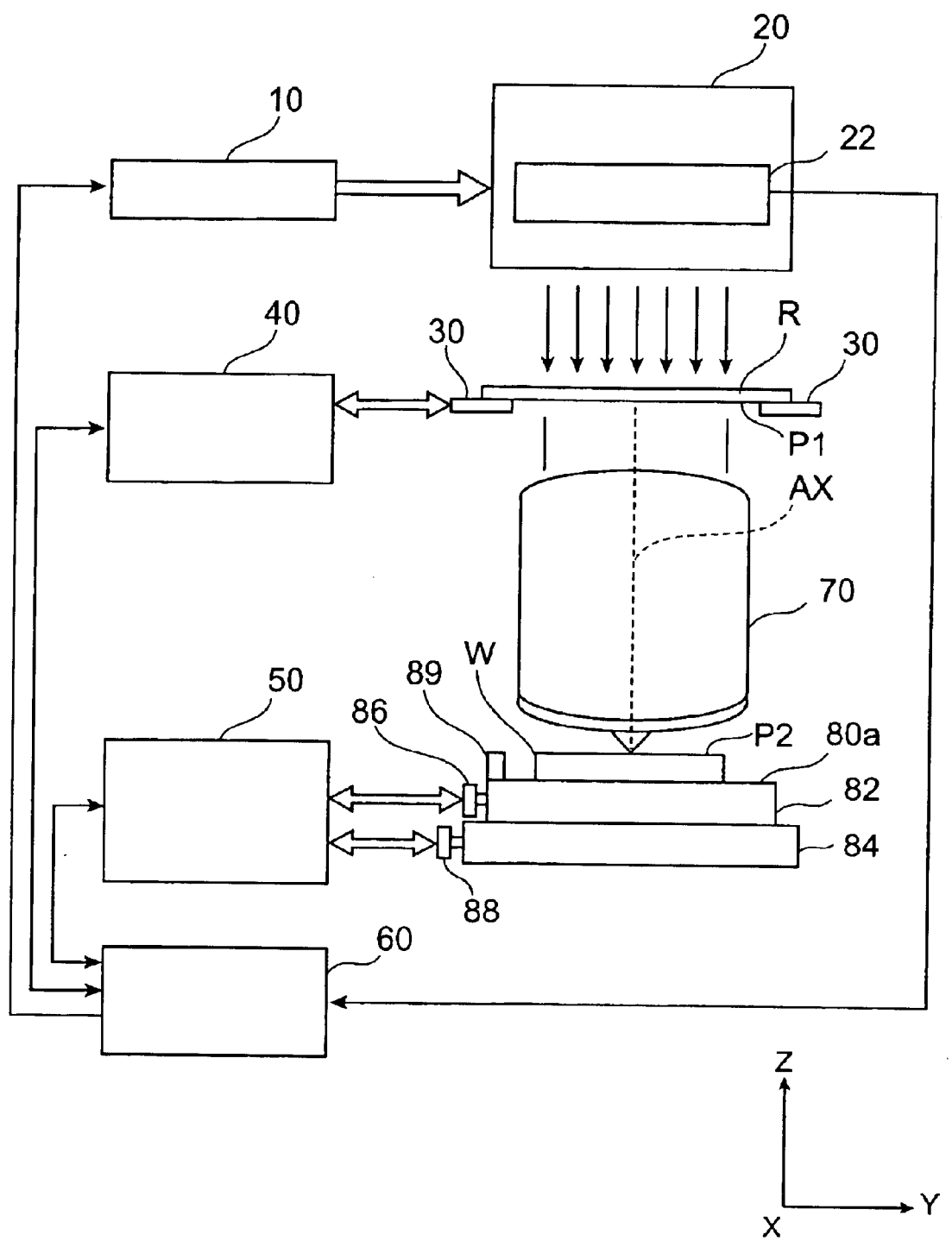
FIG. 1 is a schematic diagram showing an example of the projection exposure apparatus of the present invention.

In the following, the present invention will be explained in detail with reference to the drawing when appropriate.

First, the optical glass of the present invention will be explained. In the optical glass of the present invention, the composition ratio of the constituents satisfies the conditions mentioned above.

Among the above-mentioned constituents of the optical glass of the present invention, the $B_2O_3$ component is a glass-forming oxide and is an essential ingredient of the optical glass of present invention. The devitrifying property of the glass will increase if the $B_2O_3$ content is 30 wt % or less, whereas the chemical durability of the glass will remarkably deteriorate if the $B_2O_3$ content exceeds 60 wt %. In view of these points, the $B_2O_3$ content is preferably 35 to 60 wt %, more preferably 35 to 55 wt %.

RO is useful for adjusting the refractive index of the optical glass and improving the effect of suppressing its vitrification, and is an essential ingredient of the optical glass of the present invention. In this specification, R indicates Mg, Ca, Sr, and Ba. Therefore, RO indicates MgO, CaO, SrO, or BaO. Also, "RO (MgO+CaO+SrO+BaO) is 8 to 35 wt %" indicates that "the RO content in the optical glass is 8 to 35 wt %, i.e., the total of the MgO content [wt %], CaO content [wt %], SrO content [wt %], and BaO content [wt %] is 8 to 35 wt %." Here, the desirable refractive index cannot be obtained if the RO content is less than 8 wt %. If the RO content exceeds 35 wt %, by contrast, the tendency of vitrification to occur will increase, and the chemical durability of the optical glass will decrease. In view of these points, the RO content is preferably 8 to 26 wt %, more preferably 15 to 26 wt %.

However, if the content of MgO, which is one of RO, exceeds 5 wt %, the tendency of vitrification to occur will increase, and the chemical durability of the optical glass will decrease, even when RO (MgO+CaO+SrO+BaO) satisfies the condition of 8 to 35 wt %.

Similarly, if the CaO content exceeds 30 wt %, the tendency of vitrification to occur will increase, and the chemical durability of the optical glass will decrease, even when RO (MgO+CaO+SrO+BaO) satisfies the condition of 8 to 35 wt %. In view of such points, the CaO content is preferably 0 to 26 wt %.

Similarly, if the SrO content exceeds 30 wt %, the tendency of vitrification to occur will increase, and the chemical durability of the optical glass will decrease, even when RO (MgO+CaO+SrO+BaO) satisfies the condition of 8 to 35 wt %. In view of such points, the SrO content is preferably 0 to 26 wt %.

If the BaO content exceeds 35 wt %, the tendency of vitrification to occur will increase, and the chemical durability of the optical glass will decrease. In view of such points, the BaO content is preferably 0 to 26 wt %.

$SiO_2$ is a glass-forming oxide and is an ingredient added when necessary, since it is effective in improving the stability and chemical durability of the optical glass. If the $SiO_2$ content exceeds 14.8 wt %, however, the melting temperature of the optical glass will rise, whereby the amount of impurities mingling into the optical glass from materials constituting the crucible and furnace and the like in the manufacturing process will increase. As a result, the ultraviolet transmissivity of the optical glass will decrease. In view of this point, the $SiO_2$ content is preferably 0 to 10 wt %, more preferably 0 to 5 wt %.

$Al_2O_3$ is an ingredient added when necessary, since it is effective in improving the chemical durability of the optical glass. However, the melting property of the optical glass will deteriorate if the $Al_2O_3$ content exceeds 17.5 wt %. From the viewpoints of attaining favorable chemical durability and melting property of the optical glass, the $Al_2O_3$ content is preferably 5 to 17.5 wt %, more preferably 9 to 17.5 wt %.

When adding $Al_2O_3$ as a constituent of the optical glass, $Al_2O_3$ is preferably added such that the molar ratio of $Al_2O_3$ to $B_2O_3$ is less than 0.20 from the viewpoint of making the optical glass meltable at a lower temperature. In this specification, "the molar ratio of $Al_2O_3$ to $B_2O_3$" is the value obtained when the amount of substance [mol] of $Al_2O_3$ is divided by the amount of substance [mol] of $B_2O_3$. The chemical durability will decrease if the molar ratio of $Al_2O_3$ to $B_2O_3$ is 0.20 or greater.

$Li_2O$ is an ingredient added when necessary in order to improve the melting property of the optical glass. The chemical durability of the optical glass will decrease if the $Li_2O$ content is 0.4 wt % or greater. Also, the tendency of crucible-constituting materials to corrode will increase, so that there will be a fear of impurities mingling into the optical glass during the manufacturing thereof and thereby lowering its ultraviolet transmissivity.

$Na_2O$ is an ingredient added when necessary in order to improve the melting property of the optical glass. The chemical durability of the optical glass will decrease if the $Na_2O$ content is 3 wt % or greater. Also, the tendency of crucible-constituting materials to corrode will increase, so that there will be a fear of impurities mingling into the optical glass during the manufacturing thereof and thereby lowering its ultraviolet transmissivity. In view of such points, the $Na_2O$ content is preferably 0 to 1 wt %, more preferably 0 to 0.5 wt %.

$K_2O$ is an ingredient added when necessary in order to improve the melting property of the optical glass. The chemical durability of the optical glass will decrease if the $K_2O$ content is 3 wt % or greater. Also, the tendency of crucible-constituting materials to corrode will increase, so that there will be a fear of impurities mingling into the optical glass during the manufacturing thereof and thereby lowering its ultraviolet transmissivity. In view of such points, the $K_2O$ content is preferably 0 to 1 wt %, more preferably 0 to 0.5 wt %.

Here, in the case where $Li_2O$, $Na_2O$, and $K_2O$ mentioned above are expressed as $X_2O$ (where X indicates Li, Na, and K) as in the above-mentioned RO, it is preferred that the $X_2O$ content (hereinafter referred to as "$X_2O(Li_2O+Na_2O+K_2O)$") in the optical glass be 0 to 1 wt %. Here, "$X_2O(Li_2O+Na_2O+K_2O)$" is the total of the $Li_2O$ content [wt %], $Na_2O$ content [wt %], and $K_2O$ content [wt %] in the optical glass. As a consequence, the melting property can be improved without lowering the chemical durability.

ZnO is an ingredient added when necessary, since it has an effect of lowering the melting temperature of the optical glass and is also effective in adjusting the refractive index of the optical glass. If the ZnO content exceeds 20 wt %, however, the tendency of crucible-constituting materials to corrode will increase, so that there will be a fear of impurities mingling into the optical glass during the manufacturing thereof and thereby lowering its ultraviolet transmissivity. Also, the effect of suppressing the vitrification of the optical glass will decrease. Further, the chemical durability of the optical glass will decrease. In view of such points, the ZnO content is preferably 3 to 16 wt %, more preferably 3 to 12 wt %.

$La_2O_3$ is an ingredient added when necessary, since it is effective in improving the refractive index of the optical glass and improving the chemical durability thereof. If the $La_2O_3$ content exceeds 6.5 wt %, however, impurities contained in materials for $La_2O_3$ will be more likely to mingle into the optical glass, thereby lowering the ultraviolet transmissivity thereof. Also, the melting temperature of the optical glass will rise.

$Gd_2O_3$ is an ingredient added when necessary, since it is effective in improving the refractive index of the optical glass and improving the chemical durability thereof. If the $Gd_2O_3$ content exceeds 15 wt %, however, the effect of suppressing the devitrification will decrease. Also, the melting temperature of the optical glass will rise. In view of such points, the $Gd_2O_3$ content is preferably 0 to 12 wt %.

$Y_2O_3$ is an ingredient added when necessary, since it is effective in improving the refractive index of the optical glass and improving the chemical durability thereof. If the $Y_2O_3$ content exceeds 15 wt %, however, the effect of suppressing the devitrification will decrease. Also, the melting temperature of the optical glass will rise. In view of such points, the $Y_2O_3$ content is preferably 0 to 12 wt %.

$Ta_2O_5$ is an ingredient added when necessary, since it is effective in improving the refractive index of the optical glass and improving the chemical durability thereof. If the $Ta_2O_5$ content exceeds 10 wt %, however, the effect of suppressing the devitrification will decrease. Also, the melting temperature of the optical glass will rise. In view of such points, the $Ta_2O_5$ content is preferably 0 to 8 wt %, more preferably 0 to 6 wt %.

$ZrO_2$ is an ingredient added when necessary, since it is effective in improving the refractive index of the optical glass and improving the chemical durability thereof. If the $ZrO_2$ content exceeds 9.5 wt %, however, the effect of suppressing the devitrification will decrease. Also, the melting temperature of the optical glass will rise. In view of such points, the $ZrO_2$ content is preferably 0 to 8 wt %, more preferably 0 to 5 wt %.

$As_2O_3$ is an ingredient added when necessary, since it is effective as a defoaming accelerator. If the $As_2O_3$ content exceeds 1 wt %, it will remarkably lower the ultraviolet transmissivity of the optical glass.

$Sb_2O_3$ is an ingredient added when necessary, since it is effective as a defoaming accelerator. If the $Sb_2O_3$ content exceeds 0.5 wt %, it will remarkably lower the ultraviolet transmissivity of the optical glass. Since the $Sb_2O_3$ component remarkably lowers the ultraviolet transmissivity of the optical glass even at a very small amount, the $Sb_2O_3$ content is preferably 0 to 0.3 wt %.

Preferably, the optical glass of the present invention contains the above-mentioned constituents in the following composition ratio. Namely, it preferably comprises a composition in terms of weight ratio within the range of 0 to 14.8 wt % of $SiO_2$, 30 to 60 wt % of $B_2O_3$, 5 to 17.5 wt % of $Al_2O_3$, 0 to 0.4 wt % of $Li_2O$, 0 to 5 wt % of $Na_2O$, 0 to 1 wt % of $K_2O$, where $X_2O$ ($Li_2O+Na_2O+K_2O$) is 0 to 1 wt %, 0 to 5 wt % of MgO, 0 to 30 wt % of CaO, 0 to 30 wt % of SrO, 0 to 35 wt % of BaO, where RO (MgO+CaO+SrO+BaO) is 8 to 26 wt %, 3 to 16 wt % of ZnO, 0 to 6.5 wt % of $La_2O_3$, 0 to 15 wt % of $Gd_2O_3$, 0 to 15 wt % of $Y_2O_3$, 0 to 10 wt % of $Ta_2O_5$, 0 to 9.5 wt % of $ZrO_2$, 0 to 1 wt % of $As_2O_3$, and 0 to 0.5 wt % of $Sb_2O_3$. The optical glass comprising such a composition has an 80% transmission wavelength (at a thickness of 10 mm including no reflection loss) of 300 nm or shorter and exhibits a superior i-line transmissivity.

Without being restricted in particular, the optical glass of the present invention can be manufactured by a conventional manufacturing method. For example, the optical glass of the present invention can be manufactured by a normal manufacturing method mainly comprising a melting step of melting a glass material, glass cullet, glass frit, or the like; a glass bulk shaping step of cooling, solidifying, and shaping the melted glass; a glass bulk heat treatment step of heat-treating the glass bulk; a glass bulk cutting step of cutting a glass from the heat-treated glass bulk; and a glass member heat treatment step of heat-treating thus cut glass.

As for materials of the individual constituents of the optical glass in accordance with the present invention, those represented by the same chemical formulae (compositional formulae) can be used except for ingredients other than $B_2O_3$, $Al_2O_3$, $Li_2O$, $Na_2O$, $K_2O$, MgO, CaO, SrO, and BaO. For $B_2O_3$, $H_3BO_3$ can be used. For $Al_2O_3$, Al $(OH)_3$ can be used. For $Li_2O$, $Li_2CO_3$ or $LiNO_3$ can be used. For $Na_2O$, $Na_2CO_3$ or $NaNO_3$ can be used. For $K_2O$, $K_2CO_3$, or $KNO_3$ can be used. For MgO, $MgCO_3$ can be used. For CaO, $CaCO_3$ can be used. For SrO, $SrCO_3$ can be used. For BaO, $BaCO_3$ or $Ba(NO_3)_2$ can be used.

FIG. 1 shows a schematic diagram of an example of the projection exposure apparatus of the present invention. In FIG. 1, a direction parallel to the optical axis of a projection exposure apparatus 70 is taken as Z direction, a direction perpendicular to the Z direction within the paper surface is taken as Y direction, and a direction perpendicular to the paper surface and Z direction is taken as X direction.

The projection exposure apparatus shown in FIG. 1 is mainly constituted by an exposure light source 10, a reticle R formed with a pattern original image, an illumination optical system 20 for irradiating the reticle R with light outputted from the exposure light source 10, the projection optical system 70 for projecting on to a wafer (photosensitive substrate) W a pattern image outputted from the reticle R, and an alignment system 22 for positioning the reticle R and the wafer W with respect to each other. Also, at least a part of optical glasses constituting the irradiation optical system 20, optical glasses constituting the projection optical system 70, and the reticle R is made of the optical glass of the present invention.

The wafer W is mounted on a leveling stage (not depicted), whereas the leveling stage is installed on a Z stage 82 which can minutely be moved by a driving motor 86 in the optical axis direction (Z direction) of the projection optical system 70. The Z stage 82 is mounted on an XY stage 84 which can be moved by a driving motor 88 in two-dimensional (XY) directions in a step-and-repeat fashion. The reticle R is mounted on a reticle stage 30 which is two-dimensionally movable within a horizontal plane. By way of the illumination optical system 20, the exposure light from the exposure light source 10 uniformly illuminates the pattern formed in the reticle R, whereby a pattern image of the reticle R is exposed and transferred to a shot area of the wafer W by the projection optical system 70. As the exposure light, one having a wavelength of 436 nm (g-line), 365 nm (i-line), or the like can be used.

After the pattern of the reticle R is completely exposed and transferred to one shot area on the wafer W, the XY stage is moved in a stepping manner such that the next shot area of the wafer W coincides with the exposure area of the projection optical system 70. The two-dimensional position of the leveling stage on which the wafer W is mounted is always monitored at a resolution of about 0.01 µm, for example, as its distance from the a movable mirror secured to the leveling stage is measured by a laser interferometer (not depicted), whereas the output of the laser interferometer is supplied to a stage control system 50.

On the reticle stage 30, the reticle R is positioned such that the center of the transfer pattern on the reticle R coincides with the optical axis AX of the projection optical system 70. The positioning of the reticle R is carried out by use of a plurality of reticle alignment marks (reticle marks) disposed near the outer periphery of the reticle R. Two kinds of reticle marks, i.e., those for positioning in X direction and those for positioning in Y direction, are provided. The alignment system 22 uses, as illumination light (alignment light), a branched part of the exposure light from the exposure light source 10. One alignment system 22 is disposed at the position of each reticle alignment mark.

The illumination light transmitted through the illumination optical system 20 is made incident on a reticle mark disposed outside the pattern area of the reticle R. The reticle mark is constituted by a rectangular transparent window formed at an opaque part surrounding the pattern, for example. The alignment light reflected by the reticle mark part reenters the alignment system 22. On the other hand, by way of the projection optical system 70, the alignment light transmitted through the reticle mark is made incident on a substrate alignment mark (wafer mark) disposed about each shot area on the wafer W. The wafer mark may be disposed at a predetermined position of the wafer, e.g., an outer peripheral area of the wafer alone, instead of being disposed about each shot area. Two kinds of wafer marks, i.e., those for positioning in X direction and those for positioning in Y direction, are provided so as to correspond to the reticle marks as well. The reflection light from the wafer marks takes a path which is a reversal of that for the incident light, so as pass through the projection optical system 70 and reticle mark part, thereby reentering the alignment system 22.

Thus, as reflections of alignment light from the reticle R and wafer W are inputted, the alignment system 22 detects relative positions of the reticle R and wafer W with respect to each other. The output of the alignment system 22 is supplied to a main control system 60. The output of the main control system 60 is supplied to a reticle exchange system 40 and the stage control system 50, whereby spatial positions of the reticle R and wafer W with respect to each other are adjusted. As a result, the overlay accuracy between the pattern formed in each shot area on the wafer W and the pattern image of the reticle R to be subsequently exposed and transferred can be kept at a high level. The illuminating optical system uniformly illuminates, in a slit fashion, the reticle R as an object to be illuminated. The projection optical system 70 is disposed between a surface P1 of the reticle R and a surface P2 of the wafer W.

Thus, the transmissivity improves when the projection optical system 70, illumination optical system 20, and reticle R constituted by optical glass members of the present invention are provided, whereby a projection exposure apparatus having a high resolution can be obtained.

In the following, the present invention will be explained in detail with reference to examples, which do not limit the present invention. Among the materials for individual constituents in the optical glasses of the examples shown in the following, those expressed by the same chemical formulae (compositional formulae) were used for the ingredients other than $B_2O_3$, $Al_2O_3$, $Li_2O$, $Na_2O$, $K_2O$, MgO, CaO, SrO, and BaO. For $B_2O_3$, was used as the material. For $Al_2O_3$, $Al(OH)_3$ was used as the material. For $Li_2O$, $Li_2CO_3$ was used as the material. For $Na_2$), $Na_2CO_3$ was used as the material. For $K_2O$, both $K_2CO_3$ and $KNO_3$ were used as its materials in each example. For MgO, $MgCO_3$ was used as the material. For CaO, $CaCO_3$ was used as the material. For SrO, $SrCO_3$ was used as the material. For BaO, both $BaCO_3$, and $Ba(NO_3)_2$ were used as its materials in each example.

EXAMPLE 1

The optical glass (test piece; 100 g) comprising the composition of ingredients shown in Table 1 was manufactured according to the following procedure. First, the kinds and amounts of materials corresponding to the ingredients shown in Table 1 were introduced into a silica crucible, and then were melted under the condition of 1150° C. to 1300° C. in the atmosphere while being mixed sufficiently. Subsequently, the contents in the silica crucible were transferred into a platinum crucible, and then were refined for 15 minutes under the condition of 1150° C. to 1300° C. in the atmosphere so as to eliminate bubbles within the contents. Then, the contents within the platinum crucible were stirred so as to be homogenized. Subsequently, the contents within the platinum crucible were cast into a die which had been adjusted to a temperature of 500° C. beforehand, and were annealed. Thereafter, the annealed glass was cut and ground, whereby the test piece was obtained by 100 g.

EXAMPLES 2 to 11

A test piece (100 g) of each optical glass was manufactured in the same manner as Example 1 except that the kinds and amounts of use of individual materials were changed so as to attain its corresponding composition of ingredients shown in Table 1 or 2.

Evaluation Test of Optical Glass

According to JOGIS 01-1975 "Measuring Method for Refractive Index of Optical Glass," the refractive index (nd) and Abbe number (vd) of each optical glass in Examples 1 to 11 were measured. Also, each optical glass of Examples 1 to 11 was processed into a thickness of 10 mm, the spectral transmissivity of each optical glass when including no reflection loss was measured according to JOGIS 17-1982 "Measuring Method for Internal Transmittance of Optical Glass," and the wavelength (nm) of irradiation light at the time when the resulting spectral transmissivity was 80% was measured. These results are shown in Tables 1 and 2.

TABLE 1

|  | Example 1 | Example 2 | Example 3 | Example 4 | Example 5 |
|---|---|---|---|---|---|
| $SiO_2$ (wt %) | 5.0 | 10.0 |  | 14.8 | 1.0 |
| $B_2O_3$ (wt %) | 44.5 | 44.6 | 43.1 | 39.0 | 60.0 |
| $Al_2O_3$ (wt %) |  | 9.5 |  | 9.4 | 17.5 |
| $Li_2O$ (wt %) |  |  | 0.4 |  |  |
| $Na_2O$ (wt % |  |  |  |  | 2.0 |
| $K_2O$ (wt %) |  |  |  |  | 3.0 |
| MgO (wt %) |  |  | 5.0 |  |  |
| CaO (wt %) |  | 9.2 |  | 9.0 |  |
| SrO (wt %) |  |  | 10.0 |  | 8.0 |
| BaO (wt %) | 35.0 | 14.7 |  | 14.5 |  |
| ZnO (wt %) |  | 5.9 | 20.0 | 10.7 |  |
| $La_2O_3$ (wt %) |  |  | 6.5 |  |  |

TABLE 1-continued

|  | Example 1 | Example 2 | Example 3 | Example 4 | Example 5 |
|---|---|---|---|---|---|
| $Gd_2O_3$ (wt %) | 15.0 |  |  |  | 8.5 |
| $Y_2O_3$ (wt %) |  | 6.0 | 15.0 | 2.4 |  |
| $Ta_2O_5$ (wt %) |  |  |  |  |  |
| $ZrO_2$ (wt %) |  |  |  |  |  |
| $As_2O_3$ (wt %) |  | 0.1 |  | 0.1 |  |
| $Sb_2O_3$ (wt %) | 0.5 |  |  |  |  |
| total (wt %) | 100.0 | 100.0 | 100.0 | 100.0 | 100.0 |
| $X_2O$ (wt %) | 0.0 | 9.5 | 0.4 | 9.4 | 19.5 |
| RO (wt %) | 35.0 | 23.9 | 15.0 | 23.6 | 8.0 |
| Molar ratio of $Al_2O_3$ to $B_2O_3$ | 0.000 | 0.146 | 0.000 | 0.164 | 0.100 |
| Refractive index (nd) | 1.61348 | 1.59378 | 1.64699 | 1.59362 | 1.52796 |
| Abbe No. (vd) | 60.8 | 60.0 | 56.4 | 59.5 | 59.2 |
| Melting temp. (° C.) | 1250 | 1300 | 1200 | 1300 | 1250 |
| 80 % transmission wavelength (nm) | 312 | 292 | 330 | 251 | 326 |

TABLE 2

|  | Example 6 | Example 7 | Example 8 | Example 9 | Example 10 | Example 11 |
|---|---|---|---|---|---|---|
| $SiO_2$ (wt %) | 5.0 | 14.5 | 9.0 | 14.3 |  | 12.4 |
| $B_2O_3$ (wt %) | 47.5 | 30.0 | 45.0 | 40.3 | 50.5 | 41.3 |
| $Al_2O_3$ (wt %) | 12.0 | 1.0 |  | 9.5 | 14.6 | 9.4 |
| $Li_2O$ (wt %) |  |  |  |  |  |  |
| $Na_2O$ (wt %) |  |  | 3.0 |  |  |  |
| $K_2O$ (wt %) |  |  | 3.0 |  |  |  |
| MgO (wt %) |  | 1.0 |  | 0.5 |  |  |
| CaO (wt %) | 8.4 | 30.0 |  | 8.7 | 7.6 | 9.1 |
| SrO (wt %) |  |  | 30.0 |  |  |  |
| BaO (wt %) | 14.3 | 4.0 |  | 14.7 | 13.8 | 14.6 |
| ZnO (wt %) | 6.8 |  |  | 5.9 | 7.7 | 8.3 |
| $La_2O_3$ (wt %) |  | 3.5 |  |  |  |  |
| $Gd_2O_3$ (wt %) |  | 5.5 |  |  |  |  |
| $Y_2O_3$ (wt %) | 5.9 |  |  | 5.9 | 5.8 | 4.2 |
| $Ta_2O_5$ (wt %) |  |  | 10.0 |  |  |  |
| $ZrO_2$ (wt %) |  | 9.5 |  |  |  |  |
| $As_2O_3$ (wt %) | 0.1 | 1.0 |  | 0.1 | 0.1 | 0.1 |
| $Sb_2O_3$ (wt %) |  |  |  |  |  |  |
| Total (wt %) | 100.0 | 100.0 | 100.0 | 100.0 | 100.0 | 100.0 |
| $X_2O$ (wt %) | 12.0 | 1.0 | 3.0 | 9.5 | 14.6 | 9.4 |
| RO (wt %) | 22.6 | 35.0 | 30.0 | 23.9 | 21.4 | 23.7 |
| Molar ratio of $Al_2O_3$ to $B_2O_3$ | 0.173 | 0.011 | 0.000 | 0.081 | 0.197 | 0.154 |
| Refractive index (nd) | 1.59270 | 1.64983 | 1.61123 | 1.59330 | 1.59163 | 1.59370 |
| Abbe No. (vd) | 59.5 | 55.0 | 58.1 | 60.0 | 59.0 | 59.7 |
| Melting temp. (° C.) | 1250 | 1300 | 1250 | 1300 | 1200 | 1250 |
| 80 % transmission wavelength (nm) | 272 | 327 | 330 | 287 | 252 | 271 |

Industrial Applicability

As explained in the foregoing, the present invention can provide an optical glass having a refractive index (nd) of 1.52 to 1.65, an Abbe number (vd) of 55 to 61, and an 80% transmission wavelength (at a thickness of 10 mm including no reflection loss) of 330 nm or shorter and exhibiting an excellent chemical durability, an excellent devitrification-suppressing effect, and an excellent i-line transmissivity; and a projection exposure apparatus using the same, which can attain a high resolution.

What is claimed is:

1. An optical glass comprising a composition in terms of weight ratio within the range of:

0 to 14.8 wt % of $SiO_2$,
30 to 60 wt % of $B_2O_3$,
0 to 17.5 wt % of $Al_2O_3$,
0 to 0.4 wt % of $Li_2O$,
0 to 3 wt % of $Na_2O$,
0 to 3 wt % of $K_2O$,
0 to 5 wt % of MgO,
0 to 30 wt % of CaO,
0 to 30 wt % of SrO,
0 to 35 wt % of BaO,
where RO (MgO+CaO+SrO+BaO) is 8 to 35 wt %,
0 to 20 wt % of ZnO,
0 to 6.5 wt % of $La_2O_3$,
0 to 15 wt % of $Gd_2O_3$,
0 to 15 wt % of $Y_2O_3$,
0 to 10 wt % of $Ta_2O_5$,
0 to 9.5 wt % of $ZrO_2$, 0 to 1 wt % of $As_2O_3$, and 0 to 0.5 wt % of $Sb_2O_3$; and having a refractive index (nd) of 1.52 to 1.65, an Abbe number (vd) of 55 to 61, and an 80% transmission wavelength (at a thickness of 10 mm including no reflection loss) of 330 nm or shorter, wherein the molar ratio of $Al_2O_3$ to $B_2O_3$ is smaller than 0.20.

2. An optical glass according to claim 1, comprising a composition in terms of weight ratio within the range of:

0 to 14.8 wt % of $SiO_2$, 30 to 60 wt % of $B_2O_3$, 5 to 17.5 wt % of $Al_2O_3$, 0 to 0.4 wt % of $Li_2O$, 0 to 5 wt % of $Na_2O$, 0 to 1 wt % of $K_2O$, where $X_2O$ ($Li_2O+Na_2O+K_2O$) is 0 to 1 wt %, 0 to 5 wt % of MgO, 0 to 30 wt % of CaO, 0 to 30 wt % of SrO, 0 to 35 wt % of BaO, where RO(MgO+CaO+SrO+BaO) is 8 to 26 wt %, 3 to 16 wt % of ZnO, 0 to 6.5 wt % of $La_2O_3$, 0 to 15 wt % of $Gd_2O_3$, 0 to 15 wt % of $Y_2O_3$, 0 to 10 wt % of $Ta_2O_5$, 0 to 9.5 wt % of $ZrO_2$, 0 to 1 wt % of $As_2O_3$, and 0 to 0.5 wt % of $Sb_2O_3$; and having an 80% transmission wavelength (at a thickness of 10 mm including no reflection loss) of 300 nm or shorter.

3. A projection exposure apparatus comprising an exposure light source, a reticle formed with a pattern original image, an irradiation optical system for irradiating said reticle with light outputted from said exposure light source, a projection optical system for projecting onto a photosensitive substrate a pattern image outputted from said reticle, and an alignment system for positioning said reticle and said photosensitive substrate with respect to each other;

wherein at least a part of optical glasses constituting said irradiation optical system, optical glasses constituting said projection optical system, and said reticle is made of the optical glass according to claim 1.

* * * * *